United States Patent [19]

Troy, III et al.

[11] Patent Number: 4,999,944
[45] Date of Patent: Mar. 19, 1991

[54] WATERING ARBOR APPARATUS

[76] Inventors: Charles W. Troy, III, 225 Pine St., Catawissa, Pa. 17820; John M. Wazenski, 2 Marion Ave., Wilkes-Barre, Pa. 18702

[21] Appl. No.: 509,711

[22] Filed: Apr. 16, 1990

[51] Int. Cl.$^5$ ............................................. A01G 17/06
[52] U.S. Cl. .......................................... 47/47; 47/48.5
[58] Field of Search ....................................... 47/44–47, 47/48.5, 27

[56] References Cited

U.S. PATENT DOCUMENTS

| | | | |
|---|---|---|---|
| 3,166,869 | 1/1965 | Luper | 47/47 |
| 4,745,706 | 5/1988 | Muza et al. | 47/48.5 |
| 4,922,653 | 5/1990 | Stone | 47/48.5 |

Primary Examiner—David A. Scherbel
Assistant Examiner—Michele A. Van Patten
Attorney, Agent, or Firm—Leon Gilden

[57] ABSTRACT

A watering arbor apparatus includes a fan-like arrangement of hollow tubes converging to a common junction at lowermost terminal ends of each tube defining an elongate tubular reservoir, wherein the reservoir is in fluid communication with a lowermost hollow conical end, wherein the conical end includes a matrix of apertures therethrough to effect watering within a ground support of the apparatus. Modifications of the instant invention include extension members to extend the capacity and height of the organization, as well as selectively securable caps to restrict flow during periods of saturation in use of the apparatus. Further, an electrical heater is mounted within the reservoir for optional heating of the reservoir during frost like conditions to provide additional heat to a root system of an associated plant.

1 Claim, 5 Drawing Sheets

WATERING ARBOR APPARATUS

BACKGROUND OF THE INVENTION

1. Field of the Invention

The field of invention relates to watering apparatus, and more particularly pertains to a new and improved watering arbor apparatus wherein the same permits a metered directing of water into an underlying support ground for a plant to effect watering and selective fertilization of the plant, wherein the apparatus is transparent to permit visual observation of fluid therewithin particularly when utilizing a fertilizer solution.

2. Description of the Prior Art

Support of various plants is required due to the unsuitable base structure of such plants to maintain their vertical orientation during growth. Further, in gardening and the like, it is desirable to provide watering of such plants during periods of limited rainfall. Examples of prior art watering arrangements may be found in U.S. Pat. No. 4,745,706 to Muza, et al. wherein an elongate tubular member includes a lowermost terminal end, with a series of apertures directed therethrough, with straps mounted on the member for support of the associated plant.

U.S. Pat. No. 4,677,788 to Mastandera sets forth a support for plants and the like wherein an elongate bottle shaped lowermost terminal end includes apertures therethrough to direct fluid to the associated plant.

U.S. Pat. No. 4,393,622 to Gallo sets forth a water funnel and cart holder wherein the funnel is in fluid communication with an elongate tube, wherein the tube includes apertures at a lowermost terminal end for directing of such fluid contained within the tube to associate a plant structure.

U.S. Pat. No. 4,051,628 to Knapp sets forth a nutrient dispensing organization, wherein a container includes a lowermost stepped end directed into a soil, wherein a lower opening within the organization permits directing of fluid therefrom to the surrounding soil condition.

U.S. Pat. No. 4,499,686 to Cragg sets forth a plant watering device wherein a receptacle is provided in surrounding relationship to a tubular member, wherein the tubular member includes slots at an upper terminal end to direct such fluid from within the lowermost end of the tube that includes a second series of openings to direct fluid into surrounding soil.

As such, it may be appreciated that there continues to be a need for a new and improved watering arbor apparatus as set forth by the instant invention which addresses both the problems of ease of use, as well as effectiveness in construction in selectively directing a predetermined quantity of fluid to a surrounding soil and in this respect, the present invention substantially fulfills this need.

SUMMARY OF THE INVENTION

In view of the foregoing disadvantages inherent in the known types of watering apparatus now present in the prior art, the present invention provides a watering arbor apparatus wherein the same permits selective metering and visual observation of fluid contained within the tubular apparatus to an underlying distribution head. As such, the general purpose of the present invention, which will be described subsequently in greater detail, is to provide a new and improved watering arbor apparatus which has all the advantages of the prior art watering apparatus and none of the disadvantages.

To attain this, the present invention provides a watering arbor apparatus including a fan-like arrangement of hollow tubes converging to a common junction at lowermost terminal ends of each tube defining an elongate tubular reservoir, wherein the reservoir is in fluid communication with a lowermost hollow conical end, wherein the conical end includes a matrix of apertures therethrough to effect watering within a ground support of the apparatus. Modifications of the instant invention include extension members to extend the capacity and height of the organization, as well as selectively securable caps to restrict flow during periods of saturation in use of the apparatus. Further, an electrical heater is mounted within the reservoir for optional heating of the reservoir during frost like conditions to provide additional heat to a root system of an associated plant.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved watering arbor apparatus which has all the advantages of the prior art watering apparatus and none of the disadvantages.

It is another object of the present invention to provide a new and improved watering arbor apparatus which may be easily and efficiently manufactured and marketed.

It is a further object of the present invention to provide a new and improved watering arbor apparatus which is of a durable and reliable construction.

An even further object of the present invention is to provide a new and improved watering arbor apparatus which is susceptible of a low cost of manufacture with regard to both materials and labor, and which accordingly is then susceptible of low prices of sale to the consuming public, thereby making such watering arbor apparatus economically available to the buying public.

Still yet another object of the present invention is to provide a new and improved watering arbor apparatus which provides in the apparatuses and methods of the prior art some of the advantages thereof, while simultaneously overcoming some of the disadvantages normally associated therewith.

Still another object of the present invention is to provide a new and improved watering arbor apparatus wherein the same permits selective and metered flow to surrounding soil, and further permits optional heating of such fluid to inhibit freezing of surrounding plant conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
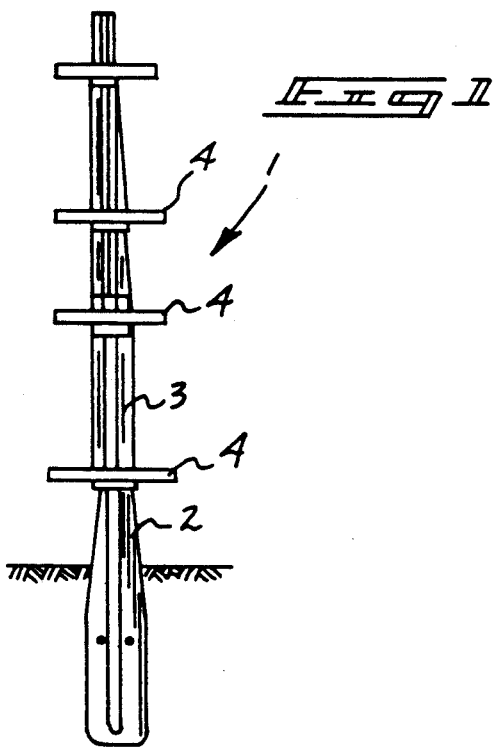
FIG. 1 is an orthographic view, taken in elevation, of a prior art watering apparatus.

With reference now to the drawings, and in particular to FIGS. 1 to 9 thereof, a new and improved watering arbor apparatus embodying the principles and concepts of the present invention and generally designated by the reference numeral 10 will be described.

Figure 2:
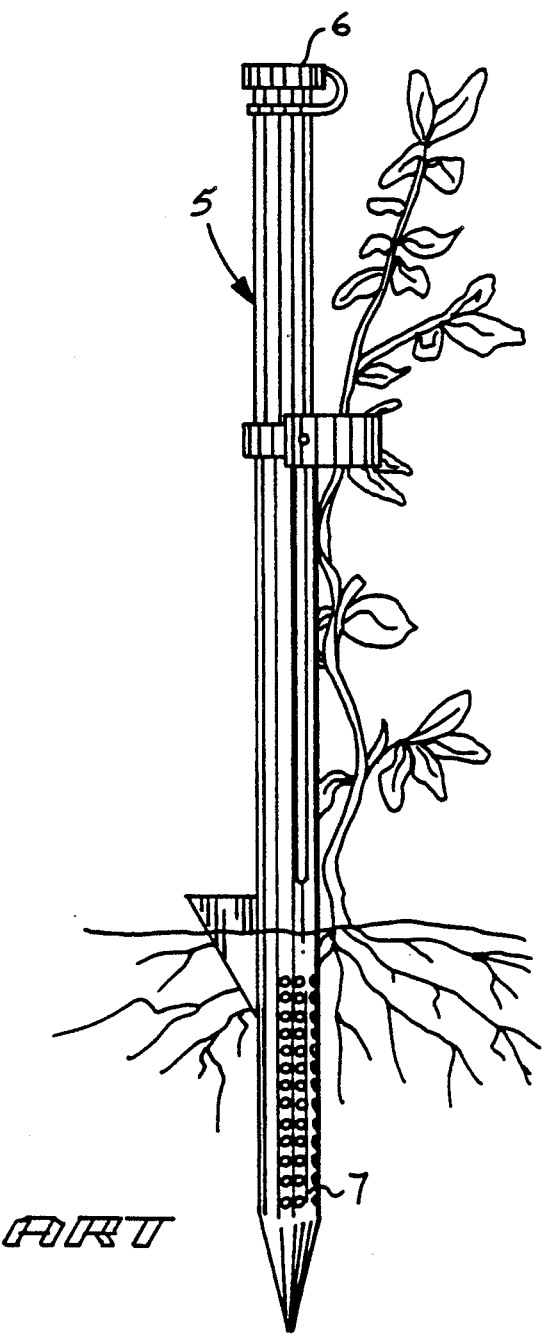
FIG. 2 is an orthographic view, taken in elevation, of a further prior art watering apparatus.
Figure 3:
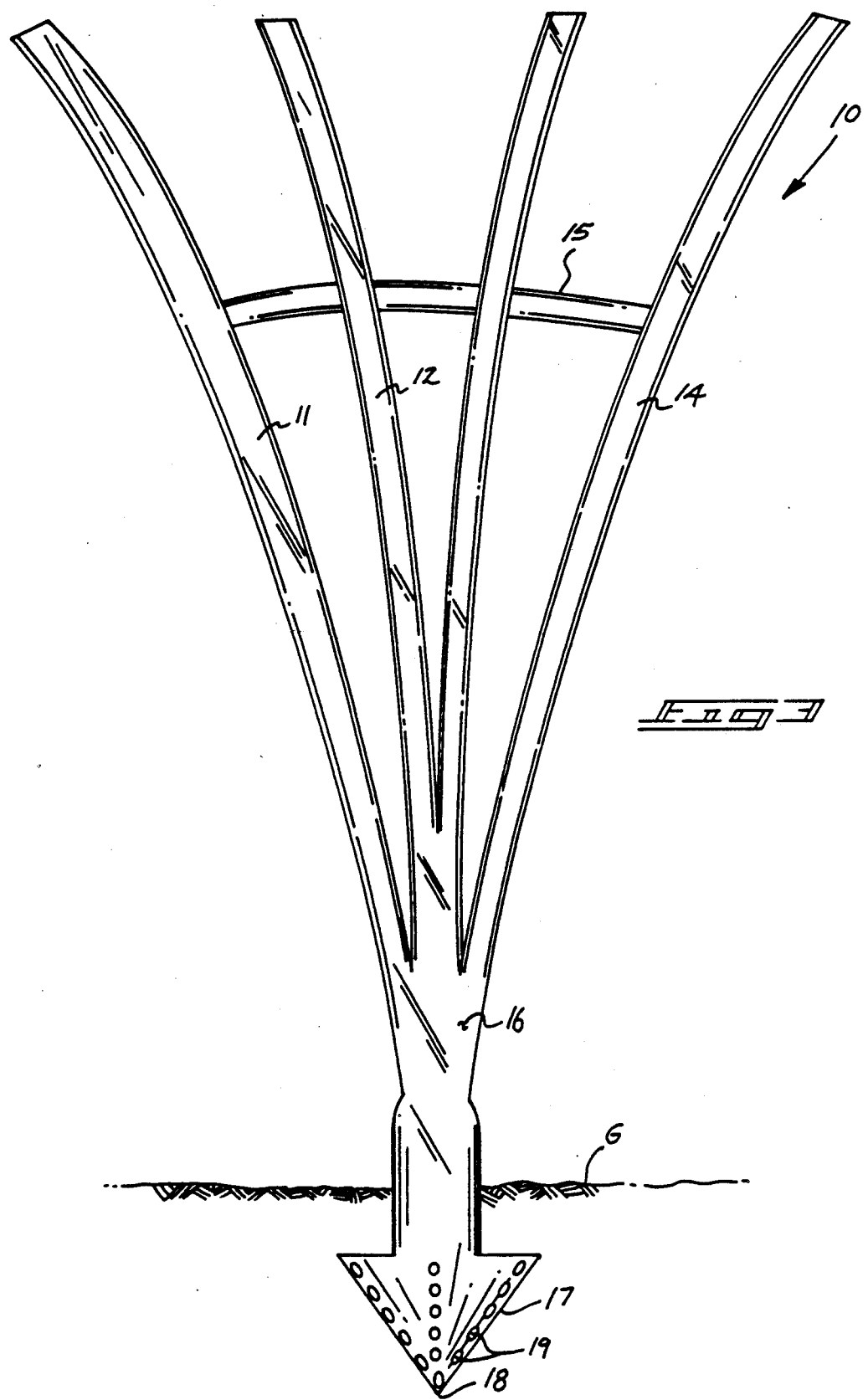
FIG. 3 is an orthographic view, taken in elevation, of the instant invention.

FIG. 1 illustrates a prior art watering apparatus 1, wherein an elongate tubular column cooperates with an underlying elongate reservoir member 2 and includes a plurality of apertures therethrough, wherein the tubular column 3 utilizes a series of support members 4 to support a plant directed through the support members. FIG. 2 illustrates a further prior art watering apparatus 5 defined as a tubular member, with a cap 6 replaceably mounted to a top end thereof, wherein a lower end of the tubular member 7 includes apertures therethrough for directing fluid contained with the tubular member to surrounding soil.

More specifically, the watering arbor apparatus 10 of the instant invention essentially comprises a series of aligned tubular columns defining a fan-like array, including a first tubular column 11, a second tubular column 12, a third tubular column 13, and a fourth tubular column 14. The tubular columns include open upper terminal ends and lower terminal ends that merge into a junction 16 defining a reservoir column, wherein a lower terminal end of the reservoir column is directed within a surrounding ground portion "G". A hollow conical projection 17 is fixedly formed to a lower terminal end of the reservoir column 16 and includes a matrix of watering apertures 19 directed therethrough. The conical projection 17 includes a lower pointed end 18 and as the conical projection 17 extends beyond the reservoir 17, stability is imparted to support of the organization within the ground "G".

Figure 4:
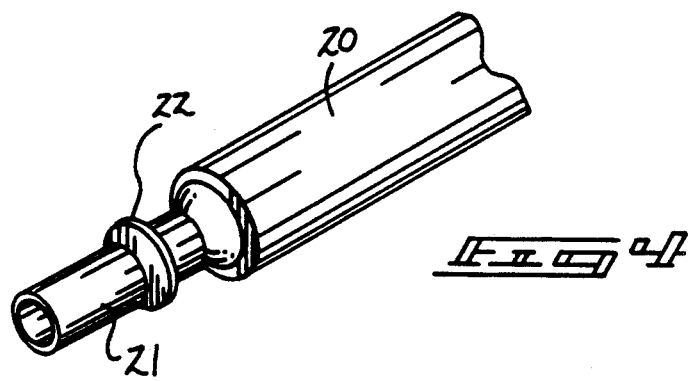
FIG. 4 is an isometric illustration of an extension tube utilized by the instant invention.
Figure 5:
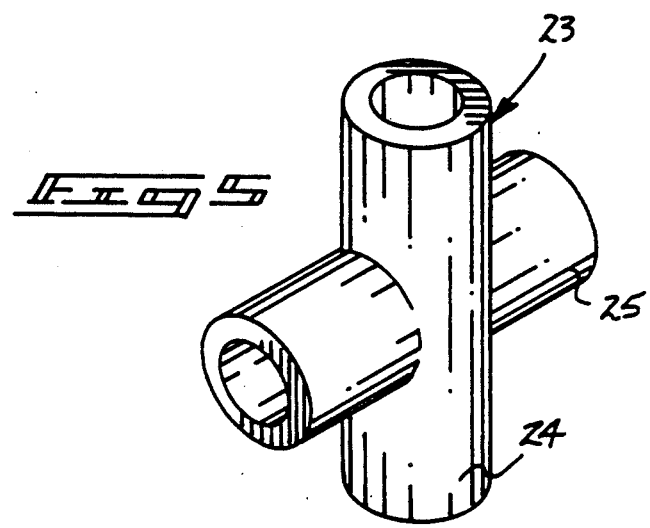
FIG. 5 is an isometric illustration of a junction utilized by the instant invention.
Figure 6:
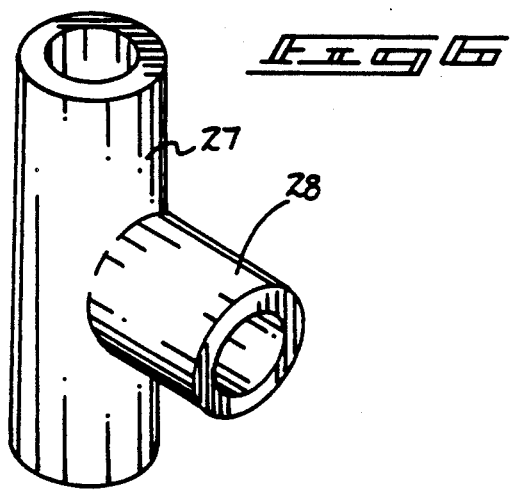
FIG. 6 is an isometric illustration of a junction "T" utilized by the instant invention.
Figure 7:
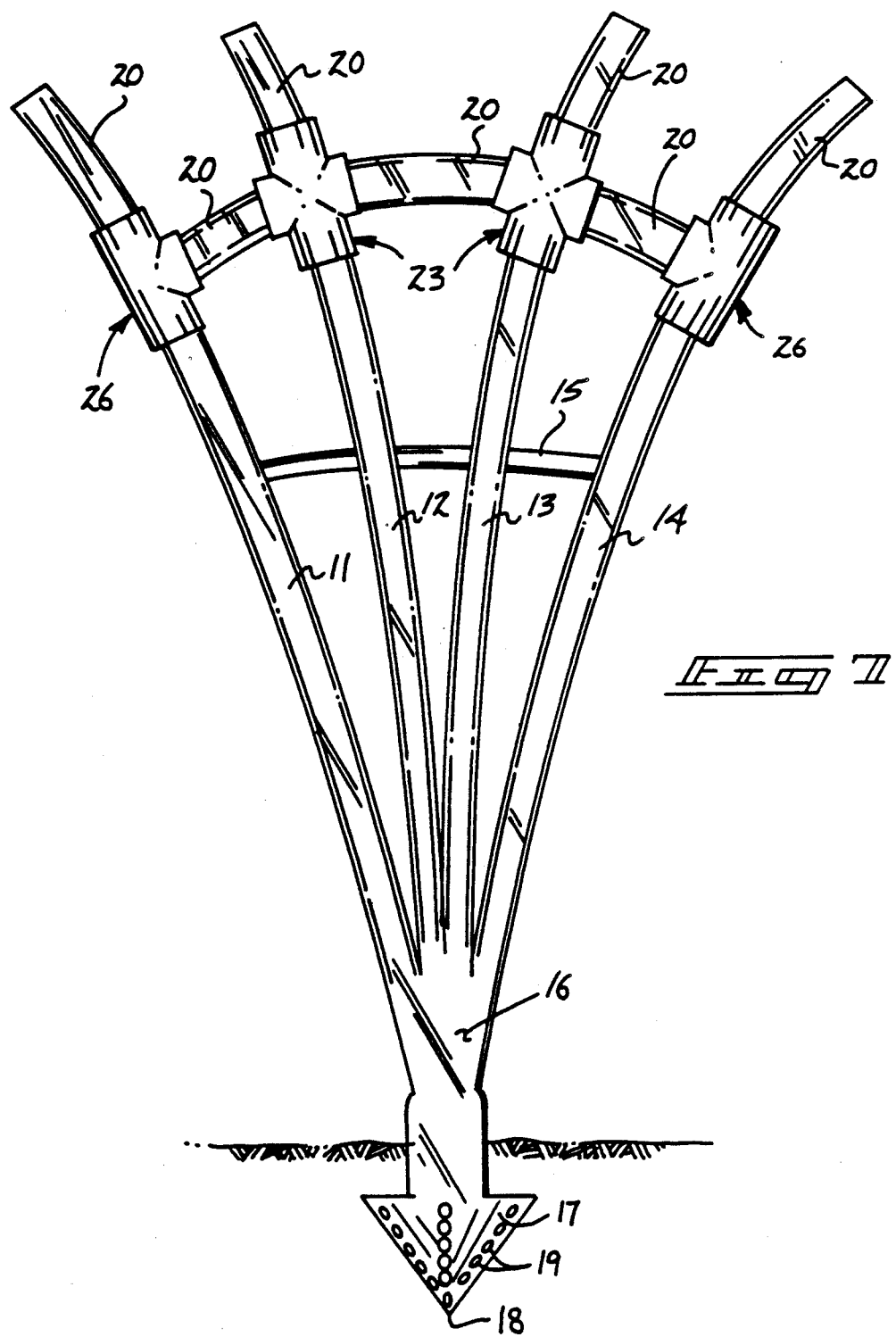
FIG. 7 is an orthographic view, taken in elevation, of the instant invention in an extended configuration.

Reference to FIGS. 4, 5, 6, and 7 illustrate the use of extension members in cooperation with the organization to selectively enlarge the organization for increased fluid capacity, as well as extended height for support of various plants thereon. FIG. 4 illustrates the use of an extension tube 20, wherein its end is tapered into a reduced connector tube 21 that includes a resilient annular seal 22 formed thereabout for sealing intercommunication of the reduced connector tube 21 within an associated tubular column 11-14. The extension tubes 20 are utilized between the tubular columns and are accordingly formed with reduced connector extensions 21 at each end thereof. To provide such expansion of the organization, a cross junction 23 and a "T" shaped junction 26 is provided, wherein the first and fourth tubular columns 11 and 14 are provided with a "T" shaped junction and the second and third tubular columns are provided cross junctions at their upper terminal ends. The cross junctions include a vertical tube member 24 orthogonally mounted to a horizontal tube member 25, while the "T" shaped junction 26 includes a first tube 27 in fluid communication with a second tube 28 directed orthogonally and medially from the first tube 27. In this manner, the extension tubes 20 may be positioned between the "T" shaped junctions 26 and the medially positioned cross junctions 23. It should be noted that all of the tubular components of the organization, as well as a tubular cross brace 15 mounted between the tubular columns underlying the upper terminal ends of the tubular columns are hollow for support of fluid therewithin. Further, the tubular components of the organization are transparent to permit visual observation of fluid contained within the organization to enable individuals to visually understand when replenishment of such fluid is required.

Figure 8:
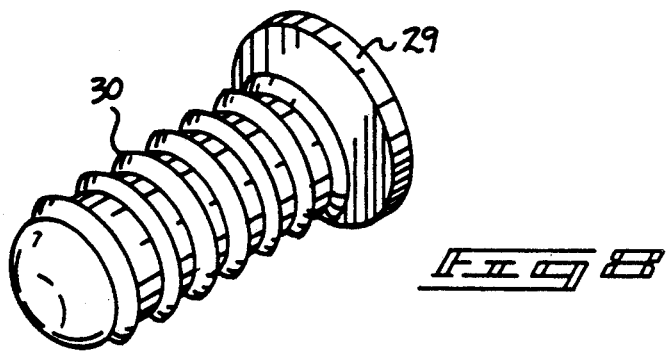
FIG. 8 is an isometric illustration of a plug utilized by the instant invention.
Figure 9:
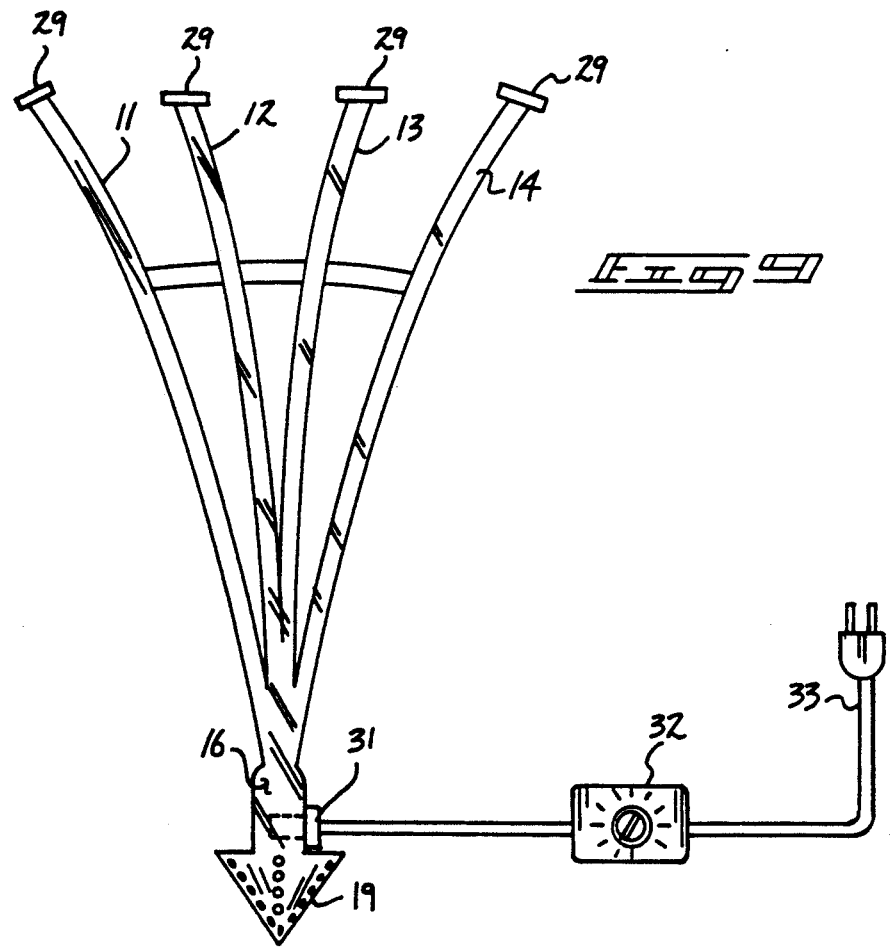
FIG. 9 is an orthographic view, taken in elevation, of the instant invention in association with a heating element.

FIG. 8 illustrates the use of a plug member, wherein the plug member includes a plug head 29 with a ribbed shank 30 integrally mounted to the lower surface of the plug head 29, wherein the ribbed shank 30 imparts a fluid-tight, as well as air-tight, seal within each of the selective tubular columns 11-14. This air-tight sealed relationship inhibits flow through the apertures 19, whereupon during conditions of saturated soil, fluid is not appreciably released through the apertures 19 into surrounding soil until such need is again required when the plugs are removed from upper terminal ends of the organization, as illustrated in FIG. 9. Further, as illustrated in FIG. 9, a resistance heater member 31 may optionally be provided and directed interiorly of the junction reservoir 16 in association with a timer mechanism 32 operative through a power cord 33 to heat fluid contained within the reservoir and thereby minimize frost damage to a root system of an associated plant during periods of freezing temperatures.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A watering trough apparatus comprising,
   a plurality of tubular column means for securing and receiving a quantity of fluid therewithin, the tubular column means including a lower reservoir mounted to a lower terminal end of the tubular column means in fluid communication therewith, and
   the reservoir defines a column, wherein the column includes a lower terminal end in fluid communication with a hollow conical projection, wherein the hollow conical projection is arranged beyond the reservoir column, including a lower pointed end with a matrix of apertures directed through the hollow conical projection, and
   wherein the tubular column means includes a first tubular column, a second tubular column, a third tubular column, and a fourth tubular column, and each of the tubular columns including a respective lower terminal end, wherein each of the lower terminal ends merge in fluid communication at the reservoir, wherein the reservoir is defined by a reservoir column, and the tubular columns are aligned relative to one another defining a fan-like array, and
   the tubular columns, the reservoir, and the conical projection are transparent, and
   further including a first "T" shaped junction mounted to an upper terminal end of the first tubular column, and a second "T" shaped junction mounted to an upper terminal end of the fourth tubular column, and a first cross junction mounted to an upper terminal end of the second tubular column, and a second cross junction mounted to an upper terminal end of the third tubular column, and an extension tube mounted between the first "T" shaped junction and the first cross junction, and an extension tube mounted between the first cross junction and the second cross junction, and an extension tube mounted between the second cross junction and the second "T" shaped junction, and the cross junction including a vertical tube member orthogonally mounted to a horizontal tube member, wherein the vertical tube member is in fluid communication with the horizontal tube member, and the "T" shaped junction includes a first tube with a second tube orthogonally directed medially of the first tube extending radially therefrom, wherein the first tube is in fluid communication with the second tube, and an extension tube mounted to each vertical tube member of each cross junction and an extension tube mounted to each first tube of each "T" shaped junction, and
   wherein each extension tube includes a tubular body and a reduced connector tube coaxially mounted to the tubular body in fluid communication therewith, and a resilient annular seal mounted in surrounding relationship relative to each reduced connector tube for fluid sealing of each connector tube to each cross junction and "T" shaped junction, and
   further including a plug member, wherein the plug member includes an enlarged head and a reduced shank, and the reduced shank includes a ribbed exterior surface, the ribbed exterior surface complementarily received within each upper terminal end of each tubular column to effect air-tight sealing of each tubular column by each plug member to restrict flow through the conical projection, and
   further including a heater element directed interiorly of the reservoir, the heater element in communication with a timer mechanism to effect heating of fluid contained within the reservoir.

* * * * *